May 17, 1966

P. GREGER ETAL 3,251,282

CAMERA WITH BUILT-IN FLASH ASSEMBLY

Filed April 7, 1964

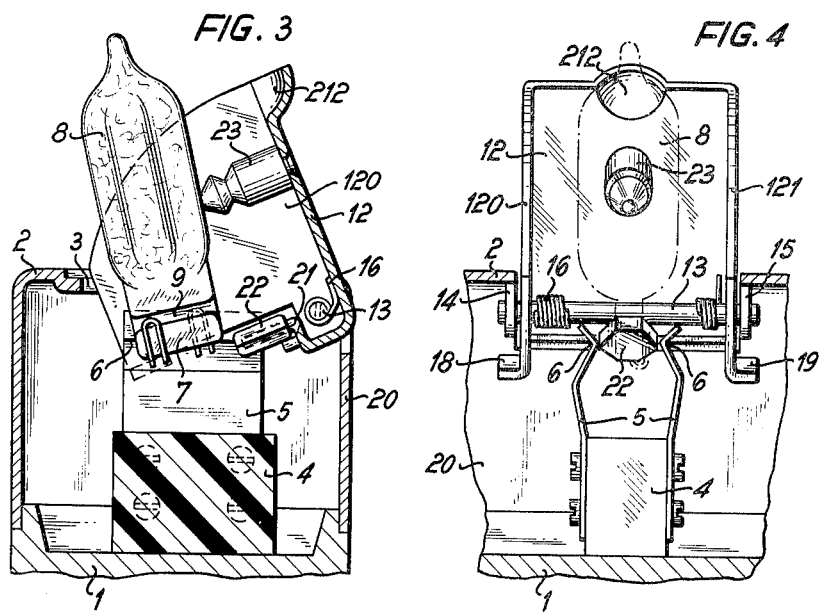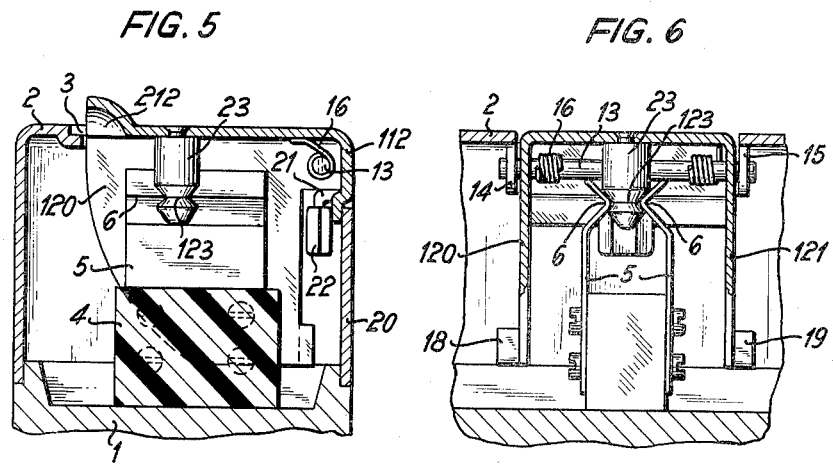

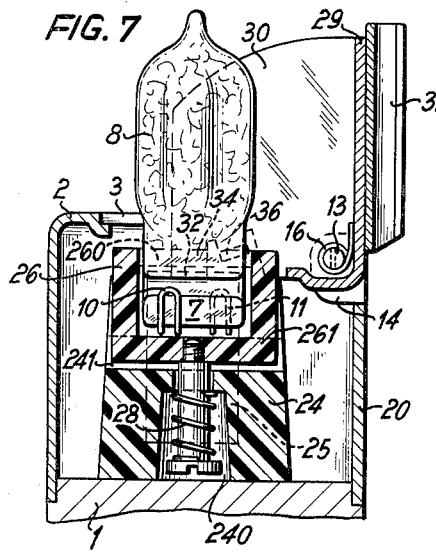
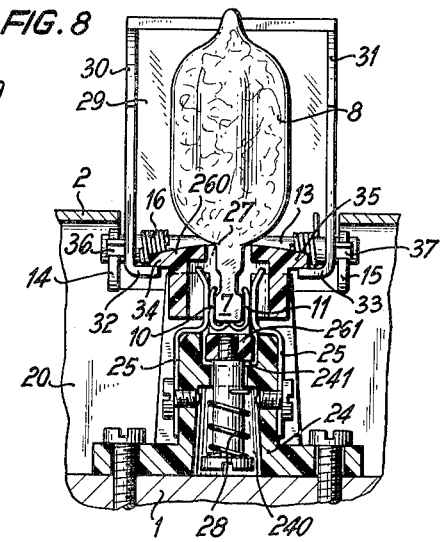
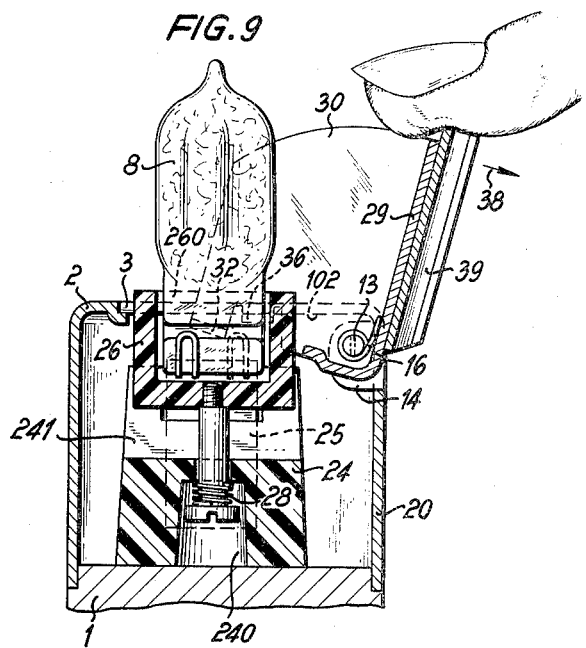

United States Patent Office 3,251,282
Patented May 17, 1966

3,251,282
CAMERA WITH BUILT-IN FLASH ASSEMBLY
Paul Greger, Erwin Doring, and Horst Knauf, Braunschweig, Germany, assignors to Voigtländer A.G., Braunschweig, Germany, a corporation of Germany
Filed Apr. 7, 1964, Ser. No. 358,013
Claims priority, application Germany, Apr. 13, 1963, V 15,044
21 Claims. (Cl. 95—11)

The present invention relates to cameras.

More particularly, the present invention relates to cameras which are provided with built-in flash assemblies.

Conventional cameras of this type may include a cap which is mounted on the housing of the camera to define with the camera housing in the interior of the cap a space for flash assembly structure such as a socket for receiving the base of a flash lamp, and the cap of the camera is usually provided with some sort of cover which is moved to give access to the socket for the flash lamp. Cameras of this type have covers on the cap which undesirably project from the cap and furthermore cameras of this type must include structure for ejecting a flash lamp after it has been ignited, and this lamp-ejecting structure also projects undesirably from the remainder of the camera.

It is, accordingly, an object of the present invention to provide a structure which will avoid the above drawbacks.

In particular, it is an object of the invention to provide a cover which is movable to give access to a lamp socket but which in its closed position projects to a very small extent from the cap so that there will be no undesirable projections with the structure of the invention.

It is, furthermore, a primary object of the present invention to provide a structure of the above type which does not require any special lamp-ejecting structure.

In particular, it is an object of the present invention to provide a structure where the movable cover itself performs the function of releasing a lamp for removal after it has been ignited.

The objects of the present invention also include the provision of a structure which is composed of simple rugged elements which are very reliable in operation and which are very easy and convenient to manipulate.

According to the invention, there is mounted on a camera housing a hollow cap which defines a given space with the camera housing and which is formed with an opening through which access may be had to this space, and within this space is locaed a releasable lamp holding means which is accessible through the opening of the cap and which may receive a flash lamp which is to be ignited. According to the present invention a cover means is carried by the cap for movement between a closed position covering the opening of the cap and an open position uncovering the opening to give access to the releasable lamp holding means, and this cover means during its movement relative to the cap engages the releasable lamp holding means to place the latter in a release position releasing a lamp from the releasable lamp holding means.

The invention is illustrated by way of example in the accompanying drawings in which:

FIG. 3 shows the position which the parts of FIG. 1 take when the cover has been displaced from its open position part of the way toward its closed position;

FIG. 4 is a transverse view of the structure of FIG. 3 also taken in front of the cover and the releasable lamp holding means;

FIG. 5 is a sectional elevation showing the structure of FIGS. 1 and 3 when the cover has been displaced to its closed position;

FIG. 6 is a sectional view taken in a plane transverse to the plane of FIG. 5 in front of the releasable holding means and through the cover;

FIG. 7 is a sectional elevation showing another embodiment of a structure according to the invention;

FIG. 8 is a sectional elevation transverse to the plane of FIG. 7 taken in front of the cover; and FIG. 9 shows how the structure of FIGS. 7 and 8 is operated to release a lamp.

Figure 1:
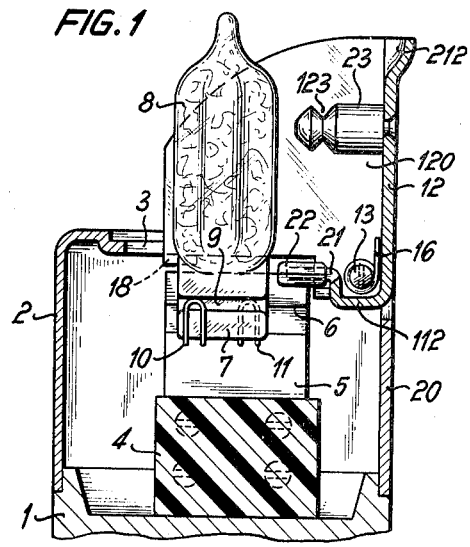
FIG. 1 is a sectional side elevation of a structure according to the present invention shown in FIG. 1 with a cover in its open position.

Referring now to FIGS. 1–6, there is shown therein, fragmentarily, the upper part of a camera housing 1 which has mounted thereon a hollow cap 2, as is conventional, and this cap defines with the housing 1 a given space which is accessible through an opening 3 which is formed in the cap. A releasable lamp holding means 4, 5 is mounted on the housing 1 within the cap, and this releasable lamp holding means is accessible through the opening 3 of the cap. The releasable lamp holding means includes a base or support member 4 which is fixed in any suitable way to the camera housing 1 and which has fixed thereto the elongated springy members 5 which are biased toward each other and which have V-shaped portions 6 arranged with crests directed toward each other and adapted to resiliently press against the base of a flash lamp 8, as shown particularly in FIG. 2, for releasably holding the flash lamp 8 in a position ready to be ignited. The support member 4 is of course made of an electrically non-conductive material such as any suitable plastic, while the springy members 5 are of course electrically conductive. The base 7 of the lamp 8 is formed at its opposite side surfaces with grooves 9 into which the crests of the portions 6 of the springy members 5 snap for releasably holding the lamp 8 in an operative position ready to be ignited. The electrical connections to the springy members 5 form no part of the present invention and are conventional, so that they are not illustrated. The lamp 8 itself has electrically conductive portions 10 and 11 engaged by the springy members 5, respectively, so that in this way the lamp 8 is connected into the electrical circuit by the springy members 5 as well as being releasably held thereby.

Figure 2:
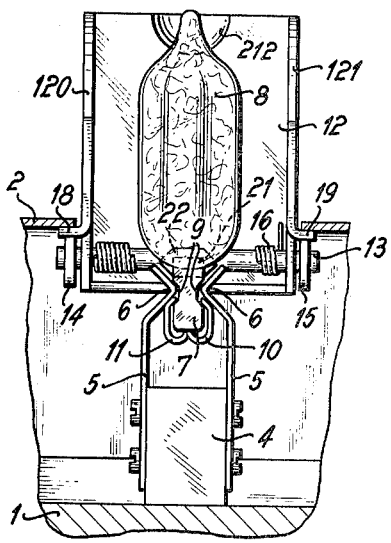
FIG. 2 is a view of the structure of FIG. 1 taken transversely to the plane of FIG. 1 in front of a releasable lamp holding means.

In order to close the opening 3 of the cap 2 a cover means 12 is provided, and this cover means 12 is supported for movement between the closed position of FIG. 5 where it closes the opening 3 and the open position of FIG. 1 by an elongated shaft 13 which is carried by a pair of lugs 14 and 15 which are fixed to the cap 2, as shown most clearly in FIG. 2, this shaft 13 passing through openings in the side walls 120 and 121 of the cover 12 so that in this way the cover 12 is supported for swinging movement between the open and closed positions respectively illustrated in FIGS. 1 and 5. A spring 16 is coiled about the shaft 13 and engages the cover 12 to urge the latter toward its open position. The cover 12 has the pair of parallel side walls 120 and 121 referred to above and a third wall which extends between the side walls and which extends across the opening 3 to cover the latter when the cover means 12 is in its closed position. These side walls 120 and 121 respectively are provided with outwardly directed projecting lugs 18 and 19 (FIG. 2) which engage the underside of the top wall of the cap 2 in order to limit the extent to which the cover means 12 will be displaced from its closed position by the spring 16, and in this way the open position of the cover 12 is determined. In its open position the cover 12 is displaced from its closed position by approximately 90° and the transverse wall of the cover 12, which extends between the parallel walls 120 and 121, forms substantially an extension of the rear wall 20 of the cap 2 in the substantially same plane as the rear wall 20, as is particularly apparent from FIG. 1. The cover 12 further includes an elongated portion 112 which extends substantially at right angles from the transverse wall which extends between the pair of parallel walls 120 and 121, and this portion 112 of the cover is located within and fills a notch at the upper rear portion of the cap 2 when the cover is in the closed position shown in FIG. 5, so that in this way the opening 3 will be closed not only at its top but also at its rear portion which extends beneath the top wall of the cap 2, and the cover will provide the cap 2 with a substantially continuous exterior surface when the cover 12 is in its closed position.

The cover 12 includes an arm 21 which extends integrally from a free edge of the portion 112 of the cover, and this arm 21 is bent as illustrated so that it extends substantially perpendicularly with respect to the main portion of the cover 12 which extends between the parallel walls 120 and 121. This arm, which can form an integral part of the sheet metal which forms the entire cover 12, has such a length that during turning of the cover between its closed and open position this arm 21 will pass between the pair of springy members 5. The arm 21 fixedly carries a wedge member 22 which is made of an electrically nonconductive material and which directly engages the springy members 5 during turning of the cover 12. In the open position of the cover 12 the wedge member 22 is located beside the base 7 of the flash lamp 8 just above the portions 6 of the springy members 5 and aligned with the space between these portions 6.

The cover 12 also carries an electrically nonconductive lamp-engaging member 23 which extends into the space between the parallel walls 120 and 121 and is directly fixed to the transverse wall extending between the parallel walls 120 and 121. It will be noted that in the open position of the cover means 12 which is illustrated in FIG. 1, the free end of the lamp-engaging member 23 is located adjacent to the lamp 8. Moreover, the member 23 is aligned with the central axis of the lamp 8. At its opposite sides and adjacent to its free end the lamp-engaging member 23 is formed with at least a pair of indented portions into which the crests of the portions 6 of the springy members 5 are adapted to snap when the cover 12 is in the closed position of FIG. 5, and in the illustrated example these indented portions form part of a continuous annular groove 123 of the V-shaped cross section which is formed in the elongated lamp-engaging pin 23 adjacent its free end and which extends all around the pin 23. The front edge of the cover 12 is curved at a central portion 212 thereof to form a slight projection which can conveniently be grasped or engaged by a finger of the operator, for example, when it is desired to displace the cover means 12 from the closed position of FIG. 5 into the open position of FIG. 1.

FIGS. 1 and 2 show the above-described structure with the cover means 12 turned up to its open position, and there is also shown in FIGS. 1 and 2 a lamp 8 in the position it takes to be ignited. This is also the position which the parts take after an exposure has been made with flash illumination and the lamp 8 which is still hot is to be removed from the camera. In order to effect such removal of the lamp 8 it is only necessary for the operator to turn the cover means 12 toward its closed position. This movement of the cover means 12 from its open toward its closed position will result in the release of the lamp 8 so that it can be removed from the camera.

During the downward turning of the cover means 12 the arm 21 with the wedge member 22, which is made of an electrically non-conductive material, turn along a circular path toward the rear wall 20 of the cap. As is illustrated in FIGS. 3 and 4 the result of this movement is that the wedge member 22 will initially engage the pair of springy members 5 and spread them apart from each other during the continued turning of the cover means 12, to an extent sufficient to terminate the clamping of the lamp 8 by the portions 6 of the springy members 5. At the same time, the lamp-engaging member 23 will engage the glass envelope of the lamp and press it during the further turning of the cover means 12 out of the socket in which the lamp is now located solely as a result of its own weight. In other words, the width of the wedge member 22 is such that when it enters into the space between the springy members 5 and engages the crests of the portions 6 thereof these portions 6 will be spread apart by a distance sufficiently great to place the releasable holding means 4, 5 in a release position where the lamp 8 is completely released for movement away from the camera. The continued turning movement of the cover means 12 toward its closed position results in movement of the lamp 8 by the lamp-engaging member 23 in a manner which displaces the lamp 8 from the releasable holding means, the lamp 8 turning in a counterclockwise direction, as viewed in FIG. 3, from the position shown in FIG. 3 during the continued turning of the cover means 12 toward its closed position, with the result that the lamp 8 is displaced out of the interior of the cap 2 and can either be permitted to fall to the floor or ground or can be caught in a hand of the operator.

The operations which are illustrated in FIG. 3 are also illustrated in FIG. 4 in a front view, and in order to more clearly illustrate the manner in which wedge member 22 cooperates with the springy members 5 the lamp 8 is only shown in phantom lines in FIG. 4.

The further movement of the cover means 12 toward its closed position displaces the lamp-engaging member 23 into the space between the springy members 5, and the substantially conical configuration of the front free end of the member 23 enables it to enter in a manner similar to the wedge member 22 into the space between the springy members 5 spreading them apart from each other at their portions 6 until the crests of the portions 6 snap into the annular recess 23 which includes the pair of opposed indentations referred to above and receiving the portions 6 of the pair of springy members 5. The groove 123 receives the V-shaped portions 6 of the springy members 5 when the cover means 12 reaches its closed position, and it will be noted that during the swinging of the cover means 12 toward its closed position the wedge member 22 has first entered into the space between the springy members 5 to spread them apart from each other, as shown most clearly in FIG. 4, and then the wedge member 22 has moved downwardly through and beyond the springy members 5 to be located behind the latter, as indicated in FIG. 5. The springy members 5 of course cooperate with the lamp-engaging member 23 to releasably hold the cover means 12 in its closed position as shown in FIG. 5. The cover is opened by overcoming the force of the springy members 5 where they engage the member 23, and of course during the return movement of the cover 12 to the open position shown in FIGS. 1 and 2 the wedge member 22 will again pass through the space between the springy members 5 spreading them apart from each other, the wedge member 22 passing at this time through the position shown in FIG. 4 but in an upward direction. In order to initiate the opening of the cover means 12 the operator will engage the portion 212 thereof. It is to be noted that when the cover means is in its closed position shown in FIG. 5 the arm 21 as well as the wedge member 22 are located closely adjacent to the rear wall 20 of the cap 2, and in addition, the arm 21 and the wedge member 20 extend in a direction parallel to the rear wall 20 of the cap 2.

The inner surface of the pair of parallel walls 120 and 121 and the transverse wall which constitute the cover member 12 can be made highly reflecting so that these parts of the cover means 12 because of their highly reflecting inner surfaces and because of their position with respect to the lamp 8 illustrated particularly in FIG. 1 can act as a reflector for the lamp 8 when the latter is ignited.

A further embodiment of the invention is illustrated in FIGS. 7–9 where those parts which are identical with those described above are indicated by the same reference characters.

With the embodiments of FIGS. 7–9, instead of releasing the lamp during movement of the cover means toward its closed position, the cover means is moved from its open position in a direction further away from the opening 3 of the cap 2 in order to effect the removal of the lamp.

In the same manner as described above, the embodiment of FIGS. 7–9 includes a camera housing 1, the upper part of which is only fragmentarily illustrated, and a hollow cap 2 is mounted on the camera housing 1 to define therewith a hollow space in which a releasable lamp holding means is located, the cap 2 being formed with the opening 3 through which access may be had to the interior of the cap 2 and through which the lamp 8 is inserted and through which in fact the lamp 8 extends when it is its operating position. The camera housing carries a stationary member 24 which forms part of the releasable holding means and which is fixed in any suitable manner to the lamp housing in alignment with the opening 3 of the cap 2, and this stationary member 24 of the releasable lamp holding means is formed with a guiding cutout in which a movable member of the releasable lamp holding means is guided for movement up and down. The stationary member 24 can be fixed to the housing 1 by screws, as illustrated in FIG. 8. The guiding cutout 241 of the stationary member 24 serves as a guide for the movable member 26 of the lamp holding means, and the stationary member 24, which is made of an electrically non-conductive material, serves to support the electrically conductive springy members 25 which are screwed to the member 24, for example. The movable member 26 of the releasable lamp holding means is also made of an electrically non-conductive material, and it includes an upper part 260 having an upper wall formed with an opening through which the base of the lamp is adapted to extend and the upper edge of which is adapted to engage the envelope of the lamp 8, and a skirt portion extends downwardly from the upper wall of member 260 and receives in its interior the upper ends of springs 25. A substantially U-shaped portion 261 of the movable member 26 extends downwardly from the skirt portion thereof which is shown most clearly in FIG. 8, and this U-shaped portion extends around the base of the lamp 8 and has an elongated horizontal portion located directly beneath the base of the lamp 8, as is particularly apparent from FIGS. 7 and 9. The upper wall of the movable member 26, at the portion 260 thereof, is formed with the opening 27 through which the base of the lamp 8 can pass, and the base 7 of the lamp 8 is shown extending through the opening 27 into the space within the skirt portion of the movable member 26.

The stationary member 24 is formed with an opening through which a screw freely passes into threaded engagement with the lower horizontal portion of the part 261 so as to be fixed thereto, and this screw member can move vertically with the movable member 26, as is clearly apparent from a comparison of FIGS. 7 and 9. The lower portion of the screw member is located within an inner hollow space 240 of the member 24, and within this space there is coiled about the screw member a spring 28 which urges the parts downwardly to the position shown in FIGS. 7 and 8. The bottom end of the spring 28 engages the head of the screw member while the upper end of the spring 28 engages the upper surface of the member 24 in the opening 240 thereof, so that in this way the spring 28 urges the movable member 26 downwardly to the position shown in FIGS. 7 and 8. In this position of the parts it will be seen that the horizontal lower part of U-shaped portion 261 extends beneath the upper ends of the springs 25 which are located relatively close to each other to resiliently press against the opposed sides of the base 7 of the lamp 8, as shown more clearly in FIG. 8. The member 26 is of course guided for vertical movement in the guiding cutout 241 of the stationary member 24, and it will be seen that in the position shown in FIGS. 7 and 8 the lowermost part 261 of the member 26 is located adjacent the bottom end of the guiding cutout 241. In this lowermost position of the movable member 26 of the releasable holding means the lamp 8 has entered into the releasable holding means to an extent sufficient to locate the bottom end of the base 7 directly next to the lowermost horizontal part of the U-shaped portion 261, while the edge of the envelope of the lamp 8 engages the upper edge of the opening 27, as mentioned above.

The opening 3 of the cap 2 of the embodiment of FIGS. 7–9 is adapted to be closed and uncovered by a cover means 29 which also has a pair of parallel side walls 30 and 31 between which the main covering wall extends, this latter main cover wall being as wide as and extending across the opening 3 when the cover means 29 is in its closed position. The side walls 30 and 31 of course in this case extend into the interior of the cap 2. As in the embodiment of FIGS. 1–6, an elongated shaft 13 serves to support the cover 29 for swinging movement between its open and closed positions, and in this case the lugs 14 and 15 which carry the free ends of the shaft 13 extend inwardly from the rear wall 20 rather than downwardly from the top wall of the cap 2. A spring 16 is coiled about the shaft 13 and presses against the cover 29 to urge the latter toward its open position shown in FIG. 7. As is apparent from FIG. 7, the transverse wall of the cover 29 forms an extension of and is located substantially in the same plane as the rear wall 20 of the cap 2 when the cover 29 is in its open position as shown in FIG. 7. The pair of side walls 30 and 31 of the cover 29 have a pair of projecting portions 32 and 33, respectively, directed toward each other and extending beneath a pair of opposed extending portions 34 and 35 of the upper part 260 of the movable member 26 of the releasable lamp holding means. Thus, the projections 32 and 33 engage beneath the projections 34 and 35, respectively, and since the spring 16 is weaker than the spring 28 the latter effectively prevents the movable member 26 from being raised upwardly by the force of the spring 16 which urges the projections 32 and 33 upwardly against the undersides of the projections 34 and 35, so that in this way the open position of the cover means 26 which is illustrated in FIG. 7 is determined. It is possible, however, for the operator to turn the cover means 29 from the open position shown in FIG. 7 further away from the opening 3 to the position shown in FIG. 9, with the operator himself overcoming the force of spring 28, and the pair of side walls 30 and 31 of the cover 29 are provided with a pair of outwardly directed projections 36 and 37 fixed respectively to the side walls and during turning of the cover 29 from the position of FIG. 7 to that of FIG. 9 approaching and finally engaging the underside of the upper wall 102 of the cap 2 for limiting the extent of turning of the cover 29 in the direction of the arrow 38 shown in FIG. 9.

It is this movement of the cover means 29 from the open position of FIG. 7 further away from the cap opening 3 to the position of FIG. 9 that produces the release of the lamp 8 by placing the releasable lamp holding means 24–26 in a lamp releasing position by way of the cover means 29 itself. This result is brought about because the turning of the cover 29 in the direction of the arrow 38 from the position of FIG. 7 into that of FIG. 9 causes the projections 32 and 33 of the walls 30 and 31, respectively, by their engagement with the projections 34 and 35 of the member 26 to raise the latter in opposition to spring 28 from the position of FIGS. 7 and 8 into the position of FIG. 9, and because of the engagement of the member 26 with the lamp 8 at the base 7 as well as at the envelope thereof, as described above, the lamp 8 will necessarily move upwardly with the movable member 26 so as to be displaced upwardly to such an elevation with respect to the springy members 25 that the latter no longer exert any holding influence on the lamp 8. Moreover, the upward movement of the member 26 causes its lowermost horizontal portion, which extends beneath the base 7 of the lamp 8, to move upwardly between the pair of springy members 25, and since the width of the lowermost horizontal part 261 is somewhat greater than the distance between the upper free end portions of the springs 25 when the latter are free to move toward each other, these springs 25 are displaced at their upper free ends apart from each other by the member 261 itself, so that the clamping of the springy members 25 on the base 7 of the lamp 8 is terminated also by the spreading apart of the springy members by the lowermost horizontal part of the portion 261 of the movable member 26.

In the position of the parts shown in FIG. 9 the lamp 8 simply rests lightly by its own weight in the movable member 26, and it is a simple matter to remove the lamp 8 at this time by tilting the camera or by a sudden, jerky upward movement of the camera which results in falling of the lamp 8 out of the member 26 with the parts in position shown in FIG. 9. Moreover, it is possible to move the cover means 29 from the position of FIG. 7 to the position of FIG. 9 in the direction of the arrow 38 with such force and swiftness that this sudden movement will itself serve to throw the lamp 8 upwardly out of the movable member 26 of the releasable lamp holding means.

When the operator releases the cover means 29 it will automatically return from the position of FIG. 9 into the position of FIG. 7 as a result of the downward movement of the member 26 by the spring 28. At this time, a new lamp 8 can be introduced into the releasable holding means 24–26, or the cover 29 may be returned to its closed position. Any suitable releasable detent structure which does not form part of the invention and which is not illustrated can releasably hold the cover means 29 in its closed position extending across and covering the opening 3 of the cap 2.

There is shown in FIGS. 7 and 9 a shoe 39 fixedly carried by the cover 29 on the exterior surface of the wall thereof which extends across and covers the opening 3. The size of the shoe 39 is at least as great as the width of the cover portion which extends across and closes the opening 3, so that when the cover means 29 is in its closed position the presence of the shoe 39 will render the interruption in the wall of the cap 2 very inconspicuous. The shoe 39 of course serves in a well known manner to support any one of a number of camera accessories, as is well known in the art.

Finally, it is to be noted that with the embodiment of FIGS. 7–9 the entire inner surface of the cover means 29 can be rendered highly reflecting so that this inner surface will cooperate with the lamp 8 to act as a reflector therefor. Moreovevr, it is possible to accommodate in the space between the side walls 30 and 31 of the cover a special reflector which may be semicircular in cross section, for example, since there is no difficulty in accommodating such a reflector above the releasable lamp holding means when the cover means 29 is in its closed position.

While specific embodiments of the invention have been shown and described in detail to illustrate the application of the principles of the invention, it will be understood that the invention may be embodied otherwise without departing from such principles.

What is claimed is:

1. In a camera with a built-in flash assembly, a camera housing, a hollow cap mounted on said camera housing and defining a hollow space therewith, said cap being formed with an opening giving access to said space, releasable lamp holding means located in said space and accessible through said opening of said cap so that a flash lamp can be held by said releasable lamp holding means when placed in engagement therewith through said opening of said cap, and cover means movably connected to said cap for movement between positions covering and uncovering said opening so that when said cover means uncovers said opening a lamp may be passed therethrough into engagement with said releasable lamp holding means, said cover means remaining in said position uncovering said opening during ignition of a lamp held by said lamp holding means, and said cover means during its movement relative to said cap cooperating with said lamp holding means for placing the latter in a position releasing the lamp for removal from said lamp holding means.

2. In a camera with a built-in flash assembly, a camera housing, a hollow cap mounted on said camera housing and defining a given space therewith, said cap being formed with an opening passing therethrough and giving access to said space, releasable lamp holding means located in said space for releasably holding a flash lamp, said releasable lamp holding means being accessible through said opening of said cap when said opening is uncovered, and cover means turnably connected to said cap for swinging movement relative thereto between a closed position covering said opening of said cap and an open position uncovering said opening of said cap so that when said cover means is in said open position thereof a lamp may be placed in engagement with said releasable lamp holding means, said cover means remaining in said open position thereof during ignition of a lamp held by said lamp holding means, and said cover means druing its swinging movement relative to said cap engaging said releasable lamp holding means for placing the latter in a position releasing a lamp for removal from said releasable lamp holding means.

3. In a camera with a built-in flash assembly, a camera housing, a hollow cap mounted on said camera housing and defining a hollow space therewith, said cap being formed with an opening giving access to said space, releasable lamp holding means located in said space and accessible through said opening of said cap so that a flash lamp can be held by said releasable lamp holding means when placed in engagement therewith through said opening of said cap, and cover means movably connected to said cap for movement between positions covering and uncovering said opening so that when said cover means uncovers said opening a lamp may be passed therethrough into engagement with said releasable lamp holding means, said cover means during its movement relative to said cap cooperating with said lamp holding means for placing the latter in a position releasing the lamp for removal from said lamp holding means, and said cover means including a pair of parallel walls and a third wall extending between and connected to said parallel walls in a plane substantially at right angles thereto, said cover means when in its closed position covering said opening having said third wall in a position forming a part of a top wall of said cap while said pair of parallel walls extends from said third wall into the interior of said cap.

4. In a camera with a built-in flash assembly, a camera housing, a hollow cap mounted on said camera housing and defining a given space therewith, said cap being formed with an opening passing therethrough and giving access to said space, releasable lamp holding means located in said space for releasably holding a flash lamp, said releasable lamp holding means being accessible through said opening of said cap when said opening is uncovered, and cover means turnably connected to said cap for swinging movement relative thereto between a closed position covering said opening of said cap and an open position uncovering said opening of said cap so that when said cover means is in said open position thereof a lamp may be placed in engagement with said releasable lamp holding means, said cover means during its swinging movement relative to said cap engaging said releasable lamp holding means for placing the latter in a position releasing a lamp for removal from said releasable lamp holding means, and said cover means engaging said releasable lamp holding means to place the latter in a lamp-releasing position during turning of said cover means from its open position toward its closed position.

5. In a camera as recited in claim 4, said cover means including an arm which is spaced from said releasable lamp holding means when said cover means is in said open position thereof and which during swinging of said cover means for said open position toward said closed position engages said releasable lamp holding means to place the latter in said lamp-releasing position.

6. In a camera having a built-in flash assembly, a camera housing, a hollow cap mounted on said camera housing and defining a given space therewith, said cap being formed with an opening through which access may be had to said space, releasable lamp holding means located in said space and including a pair of springy members which are biased toward each other and which resiliently hold thhe base of a flash lamp when the base is introduced therebetween, said releasable lamp holding means being accessible through said opening of said cap so that the base of the lamp may be placed between said springy members, and cover means turnably carried by said cap for movement between a closed position covering said opening and an open position uncovering said opening and thus giving access to said releasable lamp holding means, said cover means carrying a wedge member which is situated over said pair of springy members when said cover means is in said open position thereof and said cover means during movement from its open toward its closed position displacing said wedge member along the path extending between said pair of springy members and said wedge member being wide enough to engage and spread said springy members apart from each other to an extent sufficient to release a lamp for removal from said lamp holding means during movement of said cover means toward its closed position.

7. In a camera as recited in claim 6, said cover means also carrying a lamp-engaging member having with respect to said wedge member a location which places said lamp-engaging member in engagement with a lamp only when said wedge member has spread said springy members to an extent sufficient to release a lamp for removal from said lamp holding means, said lamp-engaging member then engaging a lamp and displacing the latter outwardly of said lamp holding means during the continued movement of said cover means toward said closed position thereof.

8. In a camera as recited in claim 7, said lamp-engaging member having a free end and being formed with indented portions, and said lamp-engaging member during the continued movement of said cover means to its closed position being displaced by said cover means along the path which introduces said free end of said lamp-engaging member between said springy members and which aligns said indented portions of said lamp-engaging member with said springy members which enter into said indented portions when said cover means has reached its closed position to cooperate with said lamp engaging member for releasably holding said cover means in its closed position, said wedge member and at least the portion of said lamp-engaging member which is engaged by said springy members being made of an electrically non-conductive material.

9. In a camera as recited in claim 8, said cover means having a wall which extends across and covers said opening of said cap when said cover means is in its closed position, and said cover means having an arm extending substantially at a right angle from said wall and carrying wedge member, said wedge member during movement of said cover means to said closed position thereof being displaced through the space between said pair of springy members and beyond the latter to a position situated outside of the space between said pair of springy members and adjacent thereto when said cover means is in its closed position.

10. In a camera with a built-in flash assembly, a camera housing, a hollow cap mounted on said camera housing and defining a given space therewith, said cap being formed with an opening through which access may be had through said space, releasable lamp holding means located in said space for releasably holding a flash lamp, said releasable lamp holding means being accessible through said opening of said cap, and cover means turnably carried by said cap for swinging movement between a closed position covering said opening and an open position uncovering said opening and thus giving access to said releasable lamp holding means, said cover means being swingable from said open position thereof in a direction away from said opening and said cover means cooperating with said releasable lamp holding means when said cover means is swung from said open position away from said opening to place said releasable lamp holding means in a position releasing a lamp for removal from said lamp holding means.

11. In a camera as recited in claim 10, said releasable lamp holding means including a stationary member and a movable member guided for movement by said stationary member and located behind the base of a lamp which is releasably held by said lamp holding means, said cover means having at least one projection which engages said movable member during movement of said cover means from said open position thereof away from said opening of said cap member and displaces said movable member relative to said stationary member of said lamp holding means in a direction displacing a lamp away from said lamp holding means to release the lamp therefrom.

12. In a camera as recited in claim 11, said cover means carrying a second projection which during turning of said cover means from said open position thereof away from said opening of said cap member engages a wall of said cap member to limit the extent of movement of said cover means away from said opening of said cap member.

13. In a camera as recited in claim 11, said movable member including a wall formed with an opening through which a base of a flash lamp is adapted to extend so that said wall surrounds the base of a flash lamp which is releasably held by said lamp holding means, and said movable member including a substantially U-shaped portion extending from said wall of said movable member around and located in part behind the base of a flash lamp releasably held by said lamp holding means, said stationary member being formed with a guiding cutout in which said U-shaped portion of said movable member is located to be guided by said stationary member for movement, and said releasable lamp holding means including a spring operatively connected to said movable member for urging the latter to a position where said U-shaped portion thereof is located to its greatest extent within said cutout of said stationary member, said movable member having a projecting portion located in the path of movement of said projection of said cover means when the latter is displaced from said open position thereof away from said opening of said cap member to be engaged by said projection and displaced in opposition to said spring outwardly of said guiding cutout of said stationary member for displacing a lamp away from said releasable holding means.

14. In a camera as recited in claim 13, said releasable lamp holding means including a pair of springy members extending from said stationary member and resiliently engaging a lamp base to releasably hold the latter and to provide electrical connections thereto, and said wall of said movable member at an edge of its opening through which the lamp base extends engaging an envelope of a flash lamp when the base thereof is operatively positioned between and engaged by said pair of springy members.

15. In a camera as recited in claim 13, spring means operatively connected to said cover means for urging the latter from said closed to said open position thereof, said spring means being weaker than the spring of said releasable holding means which urges said movable member into said guiding cutout of said stationary member, so that the engagement of said projection of said cover means with said projecting portion of said movable member determines the open position of said cover means.

16. In a camera as recited in claim 15, said cover means when in said open position thereof being displaced approximately by an angle of 90° from its closed position and during angular displacement beyond said open position by hand displacing said movable member of said releasable holding means in opposition to the spring of said releasable holding means in a direction which displaces a lamp away from said releasable holding means.

17. In a camera with a built-in flash assembly, a camera housing, a hollow cap member mounted on said camera housing and defining a given space therewith, said cap member being formed with an opening through which access may be had to said space, releasable lamp holding means located in said space and accessible through said opening for releasably holding a flash lamp, cover means turnably carried by said cap for swinging movement between a closed position covering said opening and an open position uncovering said opening to give an access to said releasable holding means, said cover means being turnable also from said open position thereof in a direction away from said opening of said cap and during turning from said open position away from said opening engaging said releasable lamp holding means for actuating the latter to release a lamp, and limiting means carried by said cover means and engaging said cap for limiting the extent of movement of said cover means from said open position thereof away from said opening of said cap, said limiting means terminating the movement of said cover means beyond said open position thereof when a lamp held by said releasable holding means has been displaced with respect to the latter to a position where it is free to move away from said releasable lamp holding means without any resistance from said releasable lamp holding means, said releasable lamp holding means including a pair of springy members which engage said lamp when the latter is in its operative position to be ignited and said springy members no longer holding said lamp when said cover means has been displaced beyond its open position to the full extent permitted by said limiting means.

18. In a camera with a built-in flash assembly, a camera housing, a hollow cap mounted on said camera housing and defining a given space therewith, said cap being formed with an opening through which access may be had to said space, releasable lamp holding means located in said space and accessible through said opening, said releasable lamp holding means including a stationary member formed with a guiding cutout and a movable member movable with respect to said stationary member and having in said guiding cutout a substantially U-shaped portion guided for movement by said cutout of said stationary member and located in part behind a base of a lamp so that when said movable member is displaced away from said stationary member said U-shaped portion thereof will displace a lamp outwardly away from said releasable holding means, said releasable holding means also including a pair of springy members resiliently engaging the base of a lamp to hold the latter and provide an electrical connection thereto, said movable member during movement of a lamp outwardly away from said releasable holding means extending at least in part between said pair of springy members and holding them apart from each other by a distance sufficient to release a lamp, and cover means turnably carried by said cap for movement between a closed position closing said opening and an open position uncovering said opening, said cover means being turnable from said open position thereof away from said opening and during turning from said open position away from said opening engaging said movable member to displace the latter away from said stationary member for displacing a lamp outwardly away from said releasable holding means.

19. In a camera with a built-in flash assembly, camera housing, a hollow cap mounted on said camera housing and defining a hollow space therewith, said cap being formed with an opening through which access may be had to said space, a releasable lamp holding means located in said space for releasably holding a flash lamp, and cover means carried by said cap for movement between a closed position covering said opening and an open position uncovering said opening, said cover means during movement relative to said cap engaging said releasable holding means and placing the latter in a release position releasing a lamp from said releasable holding means, and said cover means when in its open position forming a reflector for a flash lamp.

20. In a camera with a built-in flash assembly, a camera housing, a hollow cap mounted on said camera housing and defining a given space therewith, said cap being formed with an opening through which access may had to said space, a releasable lamp holding means located in said space and accessible through said opening for receiving and releasably holding a flash lamp, cover means movably carried by said cap for movement between a closed position covering said opening and an open position uncovering said opening, said cover means during its movement relative to said cap engaging said releasable holding means for placing the latter in a release position releasing a lamp from said releasable holding means, and said cover means having a wall which extends across and covers said opening when said cover means is in said closed position thereof, said wall having an exterior surface, and a mounting shoe fixed to said wall of said cover means at said exterior surface of said wall for mounting accessories on the camera.

21. In a camera as recited in claim 20, said mounting shoe having a width at least as great as the width of said wall of said cover means.

References Cited by the Examiner

UNITED STATES PATENTS 2,789,205  4/1957  Schwartz _____ 240—1.3

JOHN M. HORAN, *Primary Examiner.*